United States Patent [19]

Tsinober et al.

[11] Patent Number: 4,790,187
[45] Date of Patent: Dec. 13, 1988

[54] PROBE FOR DETERMINING LOCAL SHEAR STRESS

[75] Inventors: Arkady Tsinober, Raanana; Meir Teitel, Rishon Lezion; Eliezer Kit, Raanana, all of Israel

[73] Assignee: Ramot University Authority for Applied Research & Industrial Development Ltd. Tel Aviv University, Tel Aviv, Israel

[21] Appl. No.: 46,194

[22] Filed: May 5, 1987

[30] Foreign Application Priority Data

May 9, 1986 [IL] Israel ............................... 78737

[51] Int. Cl.$^4$ .............................................. G01M 9/00
[52] U.S. Cl. ..................................... 73/432.1; 73/147
[58] Field of Search ........... 73/861.08, 861.11, 861.12, 73/861.13, 861.15, 170 A, 181, 188, 189, 432.1, 841, 147, 862.69; 324/71.1, 95; 343/70

[56] References Cited

U.S. PATENT DOCUMENTS

| | | | |
|---|---|---|---|
| 3,693,440 | 9/1972 | Olson | 73/861.15 |
| 3,940,983 | 3/1976 | Greene | 73/861.13 |
| 4,000,648 | 1/1977 | Olson | 73/861.15 |
| 4,308,753 | 1/1982 | Olson | 73/861.13 |
| 4,543,822 | 10/1985 | Sorrell et al. | 73/170 A |
| 4,653,319 | 3/1987 | Parsonage | 73/861.15 |

FOREIGN PATENT DOCUMENTS 3000965 7/1981 Fed. Rep. of Germany ... 73/861.12

OTHER PUBLICATIONS

Bevir, "Induced Voltage E/M Flowmeters For Pulsating Flows", Measurement and Control, vol. 3, Dec. 1970.

Primary Examiner—Stewart J. Levy
Assistant Examiner—Robert R. Raevis
Attorney, Agent, or Firm—Benjamin J. Barish

[57] ABSTRACT

A probe, for determining local shear stress on the face of a solid surface caused by relative movement between it and a fluid, comprises a 3-dimensional array of seven spaced electrodes constituted of: one electrode at the center of the array, two electrodes equally spaced from said center electrode along a first line through said center, two electrodes equally spaced from said center electrode along a second line through said center and perpendicular to said first line, and two electrodes equally spaced from said center electrode along a third line through said center and perpendicular to said first and second lines. The probe further includes magnetic means for producing a magnetic field in the region of the electrodes.

20 Claims, 1 Drawing Sheet

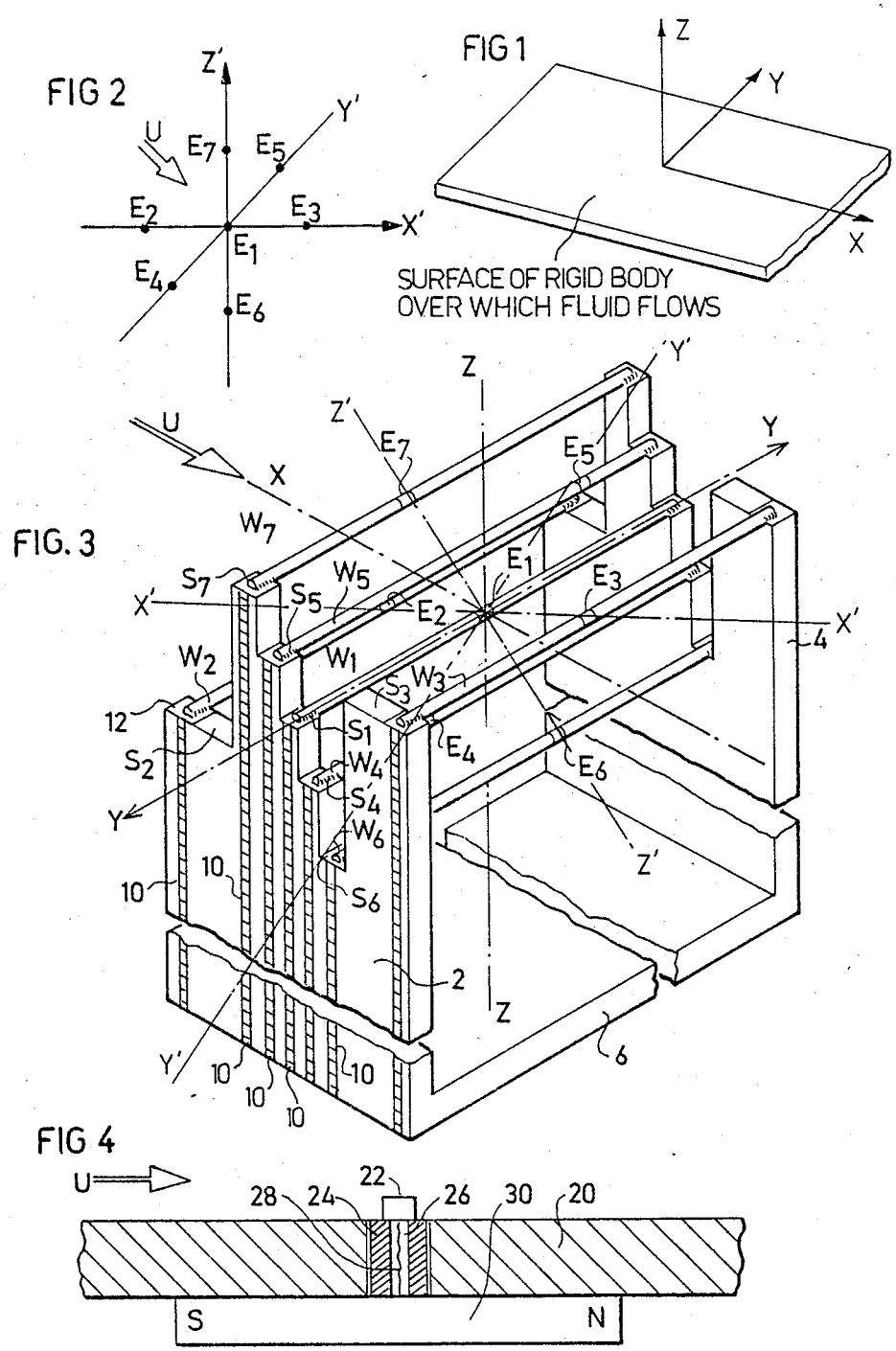

PROBE FOR DETERMINING LOCAL SHEAR STRESS

BACKGROUND OF THE INVENTION

The present invention relates to a probe for determining shear stress, and particularly to a probe for determining local shear stress on the face of a solid surface caused by relative movement between it and a fluid.

The invention is particularly applicable to measuring local shear stress on the face of a body moving in sea water, or in the air (when similarity can be used), wherein active stresses are created between the solid surface and the fluid because of the flexibility of the fluid. Measuring such shear stresses is extremely important in the design of a body moving through the fluid, such as ships, submarines and torpedoes, and in the design of aircraft moving through the air. The magnitude of the drag force acting on the body moving in the liquid or air, and opposing the movement, is directly proportional to the magnitude of the shear stress. Therefore, the measurement and mapping of such shear stresses enables making the design of the moving body more efficient so as to minimize the drag forces and thus to minimize the required energy for propelling the body through the fluid.

The techniques presently used today for measuring such shear stress have a number of drawbacks. Thus, the presently used techniques generally require calibration; this increases the time needed for making the measurement; and also increases the expense and complexity of the equipment used in making such measurement. In addition, the existing techniques for measuring shear stresses with respect to bodies moving in water generally require special treatment of the water, such as a very fine filtering system. Further, the presently used techniques are generally sensitive to the temperature of the fluid, and therefore usually require special systems for regulating the fluid temperature.

An object of the present invention is to provide a probe having advantages in the above respects for determining local sheer stress.

BRIEF SUMMARY OF THE INVENTION

According to the present invention, there is provided a probe for determining local shear stress on the face of a solid surface caused by relative movement between it and a fluid, the probe comprising a 3-dimensional including seven spaced electrodes constituted of: one electrode at the center of the array, two electrodes equally spaced from, and on opposite sides of the center electrode along a first line through said center, two electrodes equally spaced from, and on opposite sides of, the center electrode along a second line through said center and perpendicular to said first line, and two electrodes equally spaced from, and on opposite sides of, the center electrode along a third line through said center and perpendicular to said first and second lines.

The probe described below further includes magnetic means for producing a magnetic field in the region of the electrodes. The magnetic means is positionable to a first position for producing a magnetic field in the direction parallel to the fluid flow, and to a second position for producing a magnetic field in the direction perpendicular to the fluid flow.

In the described preferred embodiment, the probe includes a pair of insulated walls parallel to said first line, spaced from each other along said second line, and extending along said third line. The seven electrodes are constituted of seven insulated wires supported by and across the insulated walls at the selected locations thereof and are bared at selected points to define the 3-dimensional electrode array. Each of the pair of insulated walls is stepped at selected locations for receiving the ends of the seven insulated wires to define the 3-dimensional array.

The mathematical basis by which the probe constructed in accordance with the foregoing features may be used for determining local shear stress on the face of a solid surface experiencing relative movement with respect to a fluid is more particularly set forth below.

It will be appreciated that such a probe for determining local shear stress provides a number of important advantages. Thus, the measurement does not require calibration, and therefore it may be effected much more conveniently and quickly than existing techniques; moreover, there is no need for special treatment of the fluid, e.g. water, as in the existing techniques which require a very fine filtering system or other special treatment of the fluid; further, the measurements are not sensitive to temperature, and therefore do not require special systems for regulating the fluid temperature; still further, the probe can be constructed of a few simple parts.

Additional features and advantages of the invention will be apparent from the description below.

BRIEF DESCRIPTION OF THE DRAWINGS

The invention is herein described, by way of example only, with reference to the accompanying drawings, wherein:

FIG. 1 is a diagram helpful in understanding the mathematical basis of operation of the present invention as described below;

FIG. 2 is a diagram schematically illustrating the location of the electrodes in a probe constructed in accordance with the present invention;

FIG. 3 illustrates the construction of one such probe; and

FIG. 4 illustrates one manner of mounting the probe of FIG. 3 on the surface of a solid body moving relative to a fluid for measuring local shear stresses.

Before describing the construction of the probe as illustrated in the drawings, the following discussion of the mathematical basis for the operation of such a probe will be helpful in understanding the invention.

MATHEMATICAL BASIS OF OPERATION

From "Ohms Law" in the case of fluid flow in the presence of a magnetic field, the following equation applies:

$$\bar{j} = \sigma(\bar{U} \times \bar{B} - \text{grad } \phi) \quad (1)$$

for detailed information see for example Shercliff, J. A. 1962. The Theory of Electromagnetic Flow Measurement. Cambridge University Press.

Equation (1) may be expressed as:

$$\nabla^2 \phi = \bar{B} \cdot \bar{W} = \bar{B} \bar{W}_B \quad (2.1)$$

wherein "$\nabla^2$" is the Laplace operator $$\nabla^2\phi = \frac{\partial^2\phi}{\partial x^2} + \frac{\partial^2\phi}{\partial y^2} + \frac{\partial^2\phi}{\partial z^2},$$

"$\phi$" is the potential of the electric field "$\vec{B}$"-magnetic field magnitude; "$\vec{W}$" is the vorticity vector ("vorticity" for a fluid flow is defined as the vector equal to the curl of the velocity vector; see definition in any basic textbook on Fluid Dynamics).

From expression (2.1) one can see the $\nabla^2\phi$ is a scalar product of the two vectors "$\vec{B}$" and "$\vec{W}$"; thus just the vorticity component which is parallel to the magnetic field vector will give a quantity $\nabla^2\phi$ different from zero; that is, the measurement of $\nabla^2\phi$ will give the value of $\vec{B}\cdot\vec{W}=BW_B$.

From equation (2.1) it follows that $(\nabla^2\phi/B)=W_B$ (2.2) where "$W_B$" is the vorticity component that is parallel to the magnetic field "B".

From expression (2.2) it follows that the vorticity component parallel to the magnetic field can be determined by measuring the quantity $\nabla^2\phi$. (The strength of the magnetic field "B" is known.)

An arrangement of electrodes as shown in FIG. 2 provides a central-difference approximatation of the Laplace operator "$\nabla^2$" (see any basic textbook on Computational Fluid Mechanics).

$\phi_2-\phi_1$ = the potential difference between electrodes $E_2$ and $E_1$ (see FIG. 1) measured by electrodes $E_2$ and $E_1$ $\phi_3-\phi_1$ = the potential difference between electrodes $E_3$ and $E_1$ measured by electrodes $E_3$ and $E_1$ $$\frac{\partial^2\phi}{\partial x^2} = \frac{\frac{\phi_2-\phi_1}{\Delta x} - \frac{\phi_3-\phi_1}{\Delta x}}{\Delta x} \quad (3.1)$$

That is to say, the quantity $(\partial^2\phi)/(\partial X^2)$ is obtained from measurement of the potential difference between the two electrodes $E_2$ and $E_1$ divided by the distance between ($\Delta X$), minus the potential difference between the two electrodes $E_3$ and $E_1$ divided by the distance between them ($\alpha X$); the result is divided again by $\Delta X$.

Similar relationship exists for $(\partial^2\phi)/(\partial y^2)$ and $(\partial^2\phi)/(\partial Z^2)$; thus $$\frac{\partial^2\phi}{\partial y^2} = \frac{\frac{\phi_4-\phi_1}{\Delta x} - \frac{\phi_5-\phi_1}{\Delta x}}{\Delta x} \quad (3.2)$$

$$\frac{\partial^2\phi}{\partial z^2} = \frac{\frac{\phi_6-\phi_1}{\Delta x} - \frac{\phi_7-\phi_1}{\Delta x}}{\Delta x} \quad (3.3)$$

Since $$\nabla^2\phi = \left(\frac{\partial^2\phi}{\partial x^2} + \frac{\partial^2\phi}{\partial y^2} + \frac{\partial^2\phi}{\partial z^2}\right),$$

one can see from equations (3.1), (3.2), (3.3) that $\nabla^2\phi$ can be obtained from measurements of the potential differences between the electrodes $(E_2, E_1)$, $(E_3, E_1)$, $(E_4, E_1)$, $(E_5, E_1)$, $(E_6, E_1)$, $(E_7, E_1)$ (see FIG. 2) as indicated in equations (3.1), (3.2), (3.3).

The potential differences which are measured are $(\phi_2-\phi_1), (\phi_3-\phi_1), (\phi_4-\phi_1), (\phi_5-\phi_1), (\phi_6-\phi_1), (\phi_7-\phi_1)$ From the above discussion it is clear that an arrangement of electrodes as shown in FIG. 2 enables the calculation of $\nabla^2\phi$ from measurement of the potential differences and the use of equations (3.1), (3.2), (3.3) and thus enables obtaining the vorticity component that is parallel to the magnetic field.

Relating Vorticity to Shear Stress

The following relations are valid in the case of liquid flow on the surface of a rigid body:

$$\tau x = \mu\frac{\partial u}{\partial z} \quad \tau y = \mu\frac{\partial v}{\partial z} \quad (4)$$

wherein "$\tau x$", "$\tau y$" represent the shear stress on the surface of the body in the directions "X" and "Y" respectively (see FIG. 1); "$\mu$" is the fluid viscosity; and "U" and "V" are the components of the velocity vector in the "X" and "Y" directions respectively.

On the other hand on the surface body $$\omega y = \frac{\partial\mu}{\partial z} \quad \omega x = -\frac{\partial v}{\partial z} \quad (5)$$

wherein "Wy" and "Wx" are the vorticity vector components in the "Y" and "X" directions respectively.

From equations (4) and (5) the following equations are obtained $$\tau x = \mu Wy \quad \tau y = -\mu Wx \quad (6)$$

One can see from equation (6) that the shear stress in the "X" and "Y" directions can be obtained directly from measurements of the vorticity components "y" and "x" (the viscosity of the fluid is known). That is to say, the shear stress in the "X" direction equals $\mu$. vorticity in the Y direction. Similar relationship exist with respect to the shear stress in the Y-direction. The shear stress in the "Y"-direction equals $\mu$. vorticity in the X direction.

As was seen earlier in equation (2.2), the vorticity which is parallel to the magnetic field can be obtained from measurement of $\nabla^2\phi$; thus if we direct our magnetic field "B" in the "X" direction, a measurement of $\nabla^2\phi$ will give the vorticity component in the X direction and from which we can calculate according to equation (6) the shear stress in direction "Y". And if the magnetic field is turned to the "Y" direction, the measurement of $\nabla^2\phi$ will give us the vorticity component in the Y-direction from which we can calculate according to equation (6) the shear stress in the X-direction.

DESCRIPTION OF A PREFERRED EMBODIMENT

FIG. 2 schematically illustrates the 3-dimensional array of the electrodes included in a probe constructed in accordance with the present invention. There are seven electrodes in such a probe constructed in the form of a 3-dimensional array, as follows: one electrode $E_1$ is at the center of the array; two electrodes $E_2$, $E_3$ are equally spaced from the center electrode $E_1$ along a line $X'$ through the center electrode $E_1$; two electrodes $E_4$, $E_5$ are equally spaced from the center electrode along a second line $Y'$ through the center and perpendicular to line $X'$; and two electrodes $E_6$, $E_7$ are equally spaced from the center electrode $E_1$ along a third line $Z'$ passing through the center and perpendicular to lines $X'$ and Y'. Lines X', Y' and Z' correspond to the axes lines X, Y and Z, respectively, except that they have been rotated to avoid the below-described "shadow" effect produced during the fluid flow. The direction of fluid flow is indicated by "U" parallel to the X-axis.

Such a 3-dimensional array of electrodes is used with a magnet, e.g., a permanent bar magnet or an electromagnet, which produces a magnetic field in the region of the electrodes. The magnet, as illustrated in FIG. 4, is first oriented to produce the magnetic field in the direction of fluid flow (u), and is then rotated 90° to produce a magnetic field perpendicularly to that direction. It is seen, from the above-discussed mathematical basis equation (6), that the shear stress in the X-direction, Y-direction can therefore be determined whenever the corresponding vorticity Wx,Wy components are obtained via measuring the quantity $\nabla^2\phi$.

FIG. 3 illustrates one construction of such a probe, and FIG. 4 illustrates the manner of mounting the probe on the surface of the solid body moving relative to the fluid for measuring the local shear stresses. In order to prevent each electrode from disturbing by its shadow the other electrodes (e.g., in FIG. 2 the flow along the arrow "U" causes electrode $E_2$ to "shadow" electrodes $E_1$ and $E_3$), FIG. 3 illustrates the axes as being rotated first around the Y-axis, and then around the Z-axis. Thus, lines X', Y', Z' correspond to the axes lines X, Y, Z, but rotated about the center point occupied by electrode $E_1$, in order to avoid this "shadow" effect. It is to be noted that the quantity $\nabla^2\phi$ is not influenced by this rotation, so long as each axis remains perpendicular to each other.

The probe construction illustrated in FIG. 3 includes a 3-dimensional array of seven spaced electrodes corresponding to the array illustrated in FIG. 2, but rotated about the center, occupied by electrode $E_1$ in order to avoid the above-described shadowing effect. In order to facilitate understanding the probe construction of FIG. 3, the electrodes therein illustrated are identified by the same reference characters $E_1$–$E_7$ as in FIG. 2.

The probe illustrated in FIG. 3 comprises a U-shaped channel member including a pair of insulated walls 2, 4, joined by an interconnecting web 6 integrally formed with these walls. Walls 2, 4 are constructed so as to be parallel to the X-axis, and thereby parallel to the fluid flow direction "U". The two walls 2, 4 are spaced from each other along the Y-axis by the interconnecting web 6, and extend parallel to each other along the Z-axis.

The seven electrodes $E_1$–$E_7$ are constituted of seven insulated wires $W_1$–$W_7$, respectively, supported by and across the walls 2, 4. Each of the wires $W_1$–$W_7$ is bared (i.e. the insulation layer is removed) at selected points of the wires to define the 3-dimensional array of electrodes $E_1$–$E_7$.

More particulary, each of the two insulated walls 2, 4, is stepped for receiving the ends of the insulated wires $W_1$–$W_7$. Thus, walls 2 and 4 are each formed with seven steps, designates $S_1$–$S_7$, respectively, for receiving the ends of the seven wires $W_1$–$W_7$, such that all seven wires extend parallel to each other and perpendicularly to the direction "U" of fluid flow but at different levels. The seven wires are each bared at a selected location to define the 3-dimensional electrode array illustrated in FIG. 1. Thus, wires $W_2$ and $W_3$ are supported and are bared such as to define the two electrodes $E_2$, $E_3$ equally spaced from the center electrode $E_1$ along the X-axis; wires $W_4$, $W_5$ are supported and are bared to define the electrodes $E_4$, $E_5$ equally spaced from the center electrode $E_1$ along the Y-axis; and wires $W_6$, $W_7$ are supported and bared to define the electrodes $E_6$, $E_7$ equally spaced from the center electrode $E_1$ along the Z-axis.

The outer surfaces of the side walls 2, 4 include the electrical leads for making the electrical connections to their respective electrodes. These electrical leads are in the form of conductive pathways 10 deposited on the outer faces of the insulated walls 2, 4 and also on the upper surfaces of their respective steps, as shown at 12. To make the electrical connections to their respective wires $W_1$–$W_7$, the outer ends of the wires are stripped and are welded to the conductive deposits 12 on the respective steps $S_1$–$S_7$ of the side walls 2, 4.

The wires $W_1$–$W_7$ are preferably of silver having a suitable insulation covering. The insulation covering is removed at the locations of the respective electrodes $E_1$–$E_7$ and are coated with silver chloride at these bared locations.

As one example, the insulated walls 2, 4, as well as the interconnecting web 6, may be formed of alumina or quartz. The two walls 2, 4 may have a width of 0.36 mm along the X-axis, a height of 10 mm along the Z-axis, and may be spaced from each other 8 mm along the Y-axis by the interconnecting web 6.

FIG. 4 illustrates one manner of mounting the 3-dimensional array of electrodes illustrated in FIG. 3 to the solid body, therein designated 20, for measuring the local shear stress produced by the relative movement of the solid body within a fluid flowing in the direction "U". As shown in FIG. 4, the 3-dimensional array of electrodes, generally designated 22 in FIG. 4, is carried by a base 24 threadedly mounted within an opening 26 in the solid body 20 such that the electrode array 22 projects from one face of the solid body. The electrical lead conductors 28 from the electrodes of the array pass through opening 26. The magnet 30, which may be a permanent bar magnet or an electromagnet, is secured to the opposite face of the solid body 20.

In using the illustrated probe for measuring local shear stresses, the electric field gradient is sensed by the electrodes $E_1$–$E_7$ of the probe while the magnet 30 is oriented in the direction of the fluid flow as shown in FIG. 4. After the measurements have been taken, magnet 30 is rotated 90° so that the magnetic field produced is perpendicular to the direction of fluid flow, and additional measurements are then taken. The foregoing measurements may then be used to determine the local shear stress on the face of the solid body 20 in accordance with the mathematical discussion set forth above.

While the invention has been described with respect to one preferred emobodiment, it will be appreciated that many variations, modifications and other applications of the invention may be made.

What is claimed is:

1. A probe for determining local shear stress on the face of a solid surface caused by relative movement between the solid surface and a fluid, said probe comprising a 3-dimensional array including seven spaced electrodes constituted of: one electrode at the center of the array, two electrodes equally spaced from, and on opposite sides of, said center electrode along a first line through said center, two electrodes equally spaced from, and on opposite sides of, said center electrode along a second line through said center and perpendicular to said first line, and two electrodes equally spaced from, and on opposite sides of, said center electrode along a third line through said center and perpendicular to said first and second lines.

2. The probe according to claim 1, further including magnetic means for producing a magnetic field in the region of said electrodes.

3. The probe according to claim 2, wherein said magnetic means is positionable to a first position for producing a magnetic field in the direction parallel to the fluid flow, and to a second position for producing a magnetic field in the direction perpendicular to the fluid flow.

4. The probe according to claim 2, wherein said 3-dimensional array of electrodes is mounted to one face of said solid surface, and said magnetic means is mounted to the opposite face of said solid surface.

5. The probe according to claim 1, wherein said solid surface is formed with an opening therethrough, said probe being threadedly mounted in said opening and including electrical lead wires connected to the electrodes and passing through said opening.

6. The probe according to claim 1, further including a pair of insulated walls parallel to said first line, spaced from each other along said second line, and extending parallel to each other along said third line; said seven electrodes being constituted of seven insulated wires supported by and across said walls at selected locations thereof and bared at selected points such as to define said 3-dimensional array.

7. The probe according to claim 6, wherein each of said pair of insulated walls is stepped at selected locations for receiving the ends of said seven insulated wires to define said 3-dimensional array.

8. The probe according to claim 7, wherein said insulated walls include electrical lead conductors for making the electrical connections to said electrodes.

9. The probe according to claim 8, wherein said electrical lead conductors are in the form of conductive pathways deposited on the side faces of said insulated walls and on their respective steps, and are electrically connected to the ends of said insulated wires.

10. The probe according to claim 7, wherein the ends of said insulated wires are electrically connected by welding to the conductive deposits on said steps of the two insulated walls.

11. The probe according to claim 7, wherein said pair of insulated walls are joined together by an interconnecting web integrally formed with said walls.

12. The probe according to claim 7, wherein said pair of insulated walls each have width of 0.36 mm along the said first line, and a height of 10 mm along said third line, and are spaced from each other 8 mm along said second line.

13. The probe according to claim 7, wherein said insulated wires are of silver and include a coating of silver chloride at their bared points defining said electrodes.

14. The probe according to claim 7, wherein said pair of insulated walls are of alumina or quartz.

15. A probe for determining local shear stress on the face of a solid surface caused by relative movement between the solid surface and a fluid, said probe comprising a 3-dimensional array including seven spaced electrodes constituted of: one electrode at the center of the array, two electrodes equally spaced from, and on opposite sides of, said center electrode along a first line through said center, two electrodes equally spaced from, and on opposite sides of, said center electrode along a second line through said center and perpendicular to said first line, and two electrodes equally spaced from, and on opposite sides of, said center electrode along a third line through said center and perpendicular to said first and second lines; and magnetic means for producing a magnetic field in the region of said electrodes; said magnetic means being positionable to a first position for producing a magnetic field in the direction parallel to the fluid flow, and to a second position for producing a magnetic field in the direction perpendicular to the fluid flow.

16. The probe according to claim 15, further including a pair of insulated walls parallel to said first line, spaced from each other along said second line, and extending parallel to each other along said third line; said seven electrodes being constituted of seven insulated wires supported by and across said walls at selected locations thereof and bared at selected points such as to define said 3-dimensional array.

17. The probe according to claim 16, wherein each of said pair of insulated walls is stepped at selected locations for receiving the ends of said seven insulated wires to define said 3-dimensional array.

18. The probe according to claim 17, wherein said insulated walls include electrical lead conductors for making the electrical connections to said electrodes.

19. The probe according to claim 18, wherein said electrical lead conductors are in the form of conductive pathways deposited on the side faces of said insulated walls and on their respective steps, and are electrically connected to the ends of said insulated wires.

20. The probe according to claim 17, wherein said pair of insulated walls are joined together by an interconnecting web integrally formed with said walls.

* * * * *